United States Patent Office 3,497,478
Patented Feb. 24, 1970

3,497,478
BIS-ALLYL CARBONATES AND POLYMERS THEREOF
Nathan D. Field, Allentown, Pa., assignor to Atlantic Richfield Company, Philadelphia, Pa., a corporation of Pennsylvania
No Drawing. Filed July 5, 1967, Ser. No. 651,150
Int. Cl. C08f 3/58; C07c 69/00
U.S. Cl. 260—77.5               2 Claims

ABSTRACT OF THE DISCLOSURE

This invention relates to two novel carbonates which have the following basic structural formula

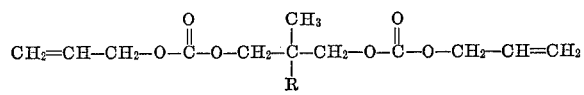

wherein R is $CH_3$ or $(CH_3)_3C—CH_2$. This invention also relates to the polymers produced from these carbonates which can be utilized as molding resins for electronic and appliance parts.

BACKGROUND OF INVENTION

The novel polymers have enhanced heat distortion characteristics and, in addition, have excellent impact resistance, scratch resistance, clarity, hardness, infusibility and water resistance. This set of properties was formerly believed to be mutually exclusive. Attempts to attain these objectives by copolymerizing the prior art monomers with maleic anhydride have been only partly successful.

The monomers have the following basic structure:

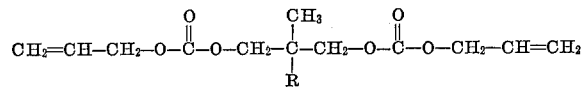

wherein R is $CH_3$ or $(CH_3)_3C—CH_2$. They can be prepared by reacting 2,2-dimethyl-propane diol (commonly known as neopentyl glycol) or 2-methyl-2-neopentyl-propane diol with allyl chloroformate in the presence of a hydrogen chloride acceptor such as pyridine or quinoline.

The polymerization can be conducted in bulk or in solution. Solvents include benzene, toluene, and xylene. High conversions are obtained by polymerizing in the presence of a catalyst such as benzoyl peroxide, lauryl peroxide, tertiary butyl hydroperoxide, peracetic acid, sodium perborate, sodium persulfate and the like. The polymerizations are preferably carried out at a temperature ranging from 50° C. to 150° C. under an inert atmosphere such as nitrogen or helium. The polymerization of allyl carbonates is described in 2,595,214 which is hereby incorporated by reference into this specification.

The resins bearing neopentyl glycol structures showed a resistance to onset of deflection up to 130° C. (ASTM D-648 modified by utilizing a two inch test beam). This may be compared with a 60° C. value for systems containing ethylene glycol structures. The former resins showed a more gradual change with temperature increase after the onset of deflection so that the total deflection at 160° C. was considerably less and sample integrity was maintained up to 195° C.

The following examples are given as specific embodiments of this invention and should not be construed as limitations upon the scope thereof.

Example I 1.1 mols of allyl chloroformate were added dropwise with vigorous stirring to 0.5 mol of 2-methyl-2-neopentyl-1,3-propane diol in 1.2 mols of pyridine. The reaction temperature was maintained below 10° C. The crude product was separated by adding water and acidification with one normal HCl. Fractionation by distillation yielded a bis-allyl carbonate having a boiling point of 132° C. at 0.5 mm. pressure, a refractive index at 25° C. of 1.4542 and the following carbon-hydrogen analysis:
Calculated for $C_{17}H_{28}O_6$: C, 62.17%; H, 8.59%. Found: C, 62.57%; H, 8.63%.

Example II

The procedure of Example I was repeated utilizing neopentyl glycol. Analysis of the product was as follows:
Refractive index at 25° C.=1.4438. Boiling point at 0.5 mm.=124° C. Calculated for $C_{13}H_{20}O_6$: C, 57.34%; H, 7.40%. Found: C, 57.58%; H, 7.35%.

Example III 0.03 g. of benzoyl peroxide was dissolved in 3 ml. of the bis-allyl carbonate prepared in Example I. Polymerization was conducted by heating the mixture in a capped vial to 60° C. for 28 hours. The polymer was isolated by precipitation from methanol. Reprecipitation from benzene into methanol followed by vacuum drying yielded a solid polymer having a melting point above 120° C. This polymer can be further cured.

Example IV

Additional polymerizations were conducted by combining 0.9 gram of benzoyl peroxide with 35 milliliters of each of the monomers of Examples I and II, and with a commercial grade bis-allyl carbonate prepared by reacting diethylene glycol with ally chloroformate. These mixtures were held between gasketed glass plates for 48 hours at 60° C. The polymerization temperature was then raised to 90° C. for 24 hours followed by a subsequent heating to 120° C. for 2 hours. The resultant polymers had the following properties:

|  | Polymers of— | | |
|---|---|---|---|
|  | (MNP)[a] | (NPG)[b] | (DEG)[c] |
| Tensile strength, p.s.i. (ASTM D1708, D638) | 4,900 | 5,250 | |
| Energy to break, ft. lb./in.³ (ASTM D1708) | 11 | 11 | |
| Elongation, percent (ASTM D1708) | 5.3 | 4.8 | |
| Elastic Modulus, p.s.i. (ASTM D1708) | 117,000 | 128,000 | |
| Scratch Resistance, kg./mm.² (ASTM D1526) | | 242 | 175 |
| Density, g./cc. | 1,145 | 1,214 | |
| Hardness, Rockwell (ASTM D785) | 92 | 94 | 86 |
| Deflection of 2″ beam at 160° C. (ASTM D648) | 0.041 | 0.016 | |

[a] MNP=The bis-allyl carbonate prepared from 2-methyl-2-neopentyl-1,3-propane diol.
[b] NPG=The bis-allyl carbonate prepared from neopentyl glycol.
[c] DEG=The bis-allyl carbonate prepared from diethylene glycol.

I claim:
1. A composition of matter having the following structural formula:
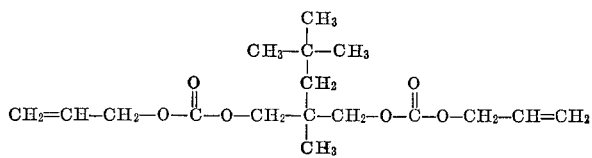
2. A homopolymer prepared from the composition of claim 1.
References Cited
UNITED STATES PATENTS
2,403,113   7/1946   Muskat et al. _____ 260—77.5
2,787,630   4/1957   Katz et al. _____ 260—463
SAMUEL H. BLECH, Primary Examiner
U.S. Cl. X.R.
260—463